United States Patent [19]
Hong

[11] Patent Number: 5,262,869
[45] Date of Patent: Nov. 16, 1993

[54] APPARATUS AND METHOD FOR MONITORING A CCTV CAMERA

[75] Inventor: Sam P. Hong, Kyungsangbook-Do, Rep. of Korea

[73] Assignee: Goldstar Co., Ltd., Rep. of Korea

[21] Appl. No.: 827,268

[22] Filed: Jan. 29, 1992

[30] Foreign Application Priority Data

Feb. 1, 1991 [KR] Rep. of Korea ............... 1743/1991

[51] Int. Cl.$^5$ .................... H04N 5/30; H04N 5/232
[52] U.S. Cl. ................................ 358/209; 358/210; 358/224
[58] Field of Search .......... 358/210, 224, 108, 209, 358/183

[56] References Cited

U.S. PATENT DOCUMENTS

| | | | |
|---|---|---|---|
| 4,244,006 | 1/1981 | Kitahara et al. | 358/210 |
| 4,507,683 | 3/1985 | Griesshaber et al. | 358/108 |
| 4,945,417 | 7/1990 | Eblerbaum | 358/108 |
| 5,060,069 | 10/1991 | Aoki | 358/909 |

FOREIGN PATENT DOCUMENTS

| | | | |
|---|---|---|---|
| 55-77281 | 6/1980 | Japan | 358/210 |
| 59-66275 | 4/1984 | Japan | 358/224 |
| 61-242176 | 10/1986 | Japan . | |
| 63-186222 | 8/1988 | Japan | 358/224 |
| 1-227580 | 9/1989 | Japan . | |
| 2-48647 | 2/1990 | Japan | 358/224 |

Primary Examiner—Michael T. Razavi
Assistant Examiner—Wendy R. Greening
Attorney, Agent, or Firm—Ostrolenk, Faber, Gerb, Soffen

[57] ABSTRACT

Monitoring apparatus and method for a CCTV monitoring camera, whereby an operation of a zoom lens and upward, downward, left and right rotating operations of the monitoring camera can readily be monitored while the monitoring camera performs a monitoring function. The monitoring apparatus comprises a rotation state detecting circuit for detecting states in which the monitoring camera is adjusted upwardly, downwardly, left and right, in response to an upward, downward, left and right rotation controller, a zooming state detecting circuit for detecting zooming states of the monitoring camera in response to a zoom lens controller, and an on-screen display control circuit for generating an on-screen display signal to display the upward, downward, left and right adjusted states and the zooming states of the monitoring camera on the screen of a monitor in response to upward, downward, left and right adjusted state detect signals from the rotation state detecting circuit and zooming state detect signals from the zooming state detecting circuit, and then combining the on-screen display signal with a video signal from the monitoring camera to output them to the monitor.

8 Claims, 7 Drawing Sheets

PICTURE 4

PICTURE 3

PICTURE 2

PICTURE 1

PICTURE 7

PICTURE 6

PICTURE 5

APPARATUS AND METHOD FOR MONITORING A CCTV CAMERA

BACKGROUND OF THE INVENTION

1. Field of the Invention

The present invention relates in general to a monitoring camera of a closed circuit television (CCTV), and more particularly to monitoring apparatus and method for the monitoring camera of the CCTV, whereby an operation of a zoom lens and upward, downward, left and right rotating operations of the monitoring camera can readily be monitored when the monitoring camera performs a monitoring function.

2. Description of the Prior Art

With reference to FIG. 1, there is shown a block diagram of conventional monitoring apparatus for a monitoring camera of a CCTV. The illustrated monitoring apparatus comprises a zoom lens controller 7 for controlling zoom-in/out of a zoom lens 1, an upward/downward rotating member 3 for rotating a monitoring camera 2 of the CCTV upwardly and downwardly, a left/right rotating member 4 for rotating the monitoring camera 2 of the CCTV to the left and right, an upward, downward, left and right rotation controller 6 for controlling upward/downward rotations of the upward/downward rotating member 3 and left/right rotations of the left/right rotating member 4, a signal processing unit 5 for processing a video signal being outputted from the monitoring camera 2, and a monitor 8 for displaying an output signal from the signal processing unit 5 on the screen.

As can be seen in FIG. 2 which is a detailed diagram of the signal processing unit 5 of FIG. 1, the signal processing unit 5 includes an input buffer 9 for inputting the video signal from the monitoring camera 2 and buffering the inputted video signal, a video amplifier 10 for amplifying an output signal from the input buffer 9 and an output buffer 11 for buffering an output signal from the video amplifier 10 and outputting the buffered signal to the monitor 8.

With reference to FIG. 3, there is shown a detailed diagram of the upward, downward, left and right rotation controller 6 in FIG. 1. As shown in this drawing, the upward, downward, left and right rotation controller 6 includes an upward/downward rotating motor 3' for rotating the upward/downward rotating member 3, an upward/downward rotating motor driver 12 for driving the upward/downward rotating motor 3', a left/right rotating motor 4' for rotating the left/right rotating member 4, a left/right rotating motor driver 13 for driving the left/right rotating motor 4', upward/downward rotating switches SW1 and SW2 for switching flow direction of an alternating current (AC) power which is supplied to the upward/downward rotating motor driver 12, in order to control the rotational direction of the upward/downward rotating motor 3', left/right rotating switches SW3 and SW4 for switching the flow direction of the AC power which is also supplied to the left/right rotating motor driver 13, in order to control the rotational direction of the left/right rotating motor 4', upward/downward rotation limited position detecting contacts 22 and 23 for detecting upward/downward rotation limited positions of the upward/downward rotating motor 3', respectively, upward/downward rotation limiting switches SW5 and SW6 for inputting rotation limited position detect signals from the upward/downward rotation limited position detecting contacts 22 and 23, as trigger signals, respectively and controlling blocking of the AC power which is supplied to the upward/downward rotating switches SW1 and SW2, in response to the inputted rotation limited position detect signals, respectively, left/right rotation limited position detecting contacts 24 and 25 for detecting left/right rotation limited positions of the left/right rotating motor 4', respectively, left/right rotation limiting switches SW7 and SW8 for inputting rotation limited position detect signals from the left/right rotation limited position detecting contacts 24 and 25, as trigger signals, respectively and controlling blocking of the AC power which is supplied to the left/right rotating switches SW3 and SW4, in response to the inputted rotation limited position detect signals, respectively, and a power control switch SW9 for controlling input of the AC power for driving the upward, downward, left and right rotations.

Also, as seen from FIGS. 4 and 6 which are a detailed diagram of the zoom lens controller 7 in FIG. 1 and a detailed circuit diagram of the zoom lens controller 7 in FIG. 4, respectively, the zoom lens controller 7 includes a zoom motor M for rotating the zoom lens 1, a clock generator 16 for generating a clock signal of desired frequency, a frequency divider 15 for frequency-dividing an output signal from the clock generator 16 by a predetermined period, a zoom motor driver 14 for driving the zoom motor M in response to an output signal from the frequency divider 15, zoom buttons PB1 and PB2 for outputting zoom-in/out control signals in accordance with a selection of the user such that the output signal from the frequency divider 15 being applied to the zoom motor driver 14 is switched to control rotating direction of the zoom motor M, zooming limited position detecting contacts 20 and 21 for detecting zooming limited positions, or rotation limited positions of the zoom motor M, respectively, and zooming limiting switches SW10 and SW11 for inputting zooming limited position detect signals from the zooming limited position detecting contacts 20 and 21, as trigger signals, respectively, and controlling a direct current (DC) power Vcc which is supplied to the zoom buttons PB1 and PB2, in response to the inputted zooming limited position detect signals, respectively. As shown in FIG. 6, the zoom lens controller 7 is also provided with AND gates G1 and G2 for ANDing the output signal from the frequency-divider 15 and output signals from the zoom buttons PB1 and PB2, respectively. Also, AND gates G1 and G2 provide drive signals to transistor pairs Q2, Q3 and Q1, Q4, respectively, which supply current to the zoom motor M in opposite directions, such that it rotates in the normal or reverse direction.

The operation of the conventional monitoring apparatus for the monitoring camera of the CCTV with the above-mentioned construction will now be described.

Typically, in the closed circuit television (CCTV), there is provided the monitoring camera which is installed in a place to be monitored, to pick up an image of the place. The image of the monitored place picked up by the monitoring camera is watched by the user in a monitoring station through the monitor. For the purpose of monitoring the desired place in every direction, the monitoring camera 2 rotates upwardly and downwardly and to the left and right as the upward/downward rotating member 3 and the left/right rotating member 4 are rotated by the upward, downward, left and right rotation controller 6. Also, the zoom lens controller 7 is adapted to control zoom-in/out of the zoom lens 1.

When the user wishes to adjust the image pickup angle of the monitoring camera 2 upwardly and downwardly and to the left and right, he or she turns on the power control switch SW9 and then operates the upward/downward rotating switches SW1 and SW2 and the left/right rotating switches SW3 and SW4 in the upward, downward, left and right rotation controller 6 in FIG. 3. The switches SW1, SW2, SW3 and SW4 are operatively connected to one another, respectively. First, if the user operates the upward/downward rotating switches SW1 and SW2 such that their movable terminals b1 and b2 are connected respectively to their fixed terminals a1 and a2, the AC power is applied to the upward/downward rotating motor driver 12, thereby causing the upward/downward rotating motor 3' to rotate the monitoring camera 2 upwardly at a desired angle. On the contrary, if the user operates the upward/downward rotating switches SW1 and SW2 such that their movable terminals b1 and b2 are connected respectively to their other fixed terminals c1 and c2, the AC power is applied to the upward/downward rotating motor driver 12, thereby causing the upward/downward rotating motor 3' to rotate the monitoring camera 2 downwardly at a desired angle.

At that time that the user operates the upward/downward rotating switches SW1 and SW2 such that the monitoring camera 2 continues to rotate in a single direction, the upward/downward rotation limited position detecting contacts 22 and 23 detect upward/downward rotation limited positions of the upward/downward rotating motor 3', respectively. Namely, as shown in FIGS. 5A and 5B, as the upward/downward rotating member 3 is rotated by the rotation of the upward/downward rotating motor 3', a rotating needle 18 rotates which is operatively connected to a center axis of rotation of the upward/downward rotating member 3. This rotation of the rotating needle 18 results in its contact with the upward or downward rotation limited position detecting contact 22 or 23 which are mounted respectively on the upward/downward rotation limited positions. Upon contact with the rotating needle 18, the upward or downward rotation limited position detecting contact 22 or 23 outputs a rotation limited position detect signal as a trigger signal to the upward or downward rotation limiting switch SW5 or SW6. As a result, the upward or downward rotation limiting switch SW5 or SW6 is opened resulting in blocking of the AC power, thereby causing the upward/downward rotating motor 3' to be stopped.

On the other hand, when the user wishes to adjust the image pickup angle of the monitoring camera 2 to the left and right, he or she turns on the power control switch SW9 and then operates the left/right rotating switches SW3 and SW4 in the upward, downward, left and right rotation controller 6 in FIG. 3, in a similar manner to the upward and downward adjustments of the monitoring camera 2. Similarly, limits in angles of the left/right rotations of the monitoring camera 2 are controlled by the left/right rotation limiting switches SW7 and SW8 based on the detection of left/right rotation limited positions of the left/right rotating motor 4' by the left/right rotation limited position detecting contacts 24 and 25. At that time that the user does not operate the upward/downward rotating switches SW1 and SW2 and the left/right rotating switches SW3 and SW4, their movable terminals b1-b4 are respectively connected to their central fixed terminals x1-x4, resulting in blocking of the AC power.

On the other hand, the zoom lens controller 7 is adapted to control zoom-in/out of the zoom lens 1. As shown in FIGS. 4 and 6, if the user pushes the zoom button PB1, the DC power is applied to a resistor R2 and one input terminal of the AND gate G1 through the zoom button PB1. The clock signal generated from the clock generator 16 is frequency-divided by the frequency divider 15 and the frequency-divided signal from the frequency divider 15 is then applied to the other input terminal of the AND gate G1. As a result, the frequency-divided signal from the frequency divider 15 is applied to bases of transistors Q2 and Q3 in the zoom motor driver 14 through the AND gate G1. For this reason, the zoom motor M rotates in one direction, resulting in zooming of the zoom lens 1. Also, if the user pushes the zoom button PB2, the DC power is applied to the resistor R2 and one input terminal of the AND gate G2 through the zoom button PB2. Also, the frequency-divided signal from the frequency divider 15 is applied to the other input terminal of the AND gate G2. As a result, the frequency-divided signal from the frequency divider 15 is applied to bases of transistors Q1 and Q4 in the zoom motor driver 14 through the AND gate G2. For this reason, the zoom motor M rotates in the other direction, resulting in zooming of the zoom lens 1.

At that time the zoom-in/out of the zoom lens 1 is controlled by pushing of the zoom buttons PB1 and PB2 by the user, the rotation limited positions of the zoom motor M are detected by the zooming limited position detecting contacts 20 and 21 which are mounted respectively on the rotation limited positions. Upon detect of the rotation limited positions, or zooming limited positions by the zooming limited position detecting contacts 20 and 21, the zooming limiting switches SW10 and SW11 are turned off, resulting in apply of low signals to the one input terminals of the AND gates G1 and G2. These low signals to the AND gates G1 and G2 block the output of the frequency divider 15 to the AND gates G1 and G2, thereby causing the zoom motor M to be stopped.

However, the conventional monitoring apparatus for the monitoring camera of the CCTV has a disadvantage, in that it is difficult to ascertain whether the current zooming position is the zoom-in position, the zoom-out position, or the zooming limited position. Moreover, the conventional monitoring apparatus has a further disadvantage, in that it is inconvenient to use, since the user must push the upward, downward, left and right rotating switches, while watching pictures on the screen of the monitor, to confirm states of the pictures moving on the screen in order to check whether the upward, downward, left and right rotating operations of the monitoring camera are normal or not.

SUMMARY OF THE INVENTION

Therefore, it is an object of the present invention to provide monitoring apparatus and method for a monitoring camera of a CCTV, wherein operating modes of the monitoring camera are displayed on the screen of a monitor so that the user can readily operate the monitoring camera and wherein a screen center point of a key position is caught and displayed while zooming so that the user can easily enlarge-monitor a picture of a desired place on the screen of the monitor.

In accordance with one aspect of the present invention, there is provided an apparatus for monitoring a monitoring camera of a CCTV, comprising: a rotation state detecting unit for detecting states that the monitoring camera is adjusted upwardly, downwardly, left and right, from an upward, downward, left and right rotation controller; a zooming state detecting means for detecting zooming states of the monitoring camera from a zoom lens controller; and an on-screen display control unit for generating an on-screen display signal to display the upward, downward, left and right adjusted states and the zooming states of the monitoring camera on the screen of a monitor in response to upward, downward, left and right adjusted state detect signals from the rotation state detecting unit and zooming state detect signals from the zooming state detecting unit and then combining the on-screen display signal with a video signal from the monitoring camera to output them to the monitor.

In accordance with another aspect of the present invention, there is provided a method for monitoring a monitoring camera for a CCTV, comprising: an on-screen display mode select step of checking whether an on-screen display switch is at its ON state and making an on-screen display IC enable when the on-screen display switch is at its ON state; a rotation stage on-screen display switch is at its on state; a rotation state on-screen display step of checking upward, downward, left and right adjusted states of the monitoring camera detected by a rotation state detecting circuit, upon the selection of the on-screen display mode, and displaying the checked results on the screen by the on-screen display IC; and a zooming state of screen display step of checking zooming states of the monitoring camera, if a zooming interrupt signal from a zooming state detecting circuit becomes active on the basis of the adjustment of a zoom lens other than the upward, downward, left and right adjustments of the monitoring camera, in the on-screen display mode, and displaying the checked results on the screen by the on-screen display IC.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

First, a construction of monitoring apparatus for a monitoring camera of a CCTV in accordance with the present invention will be described.

Figure 1:
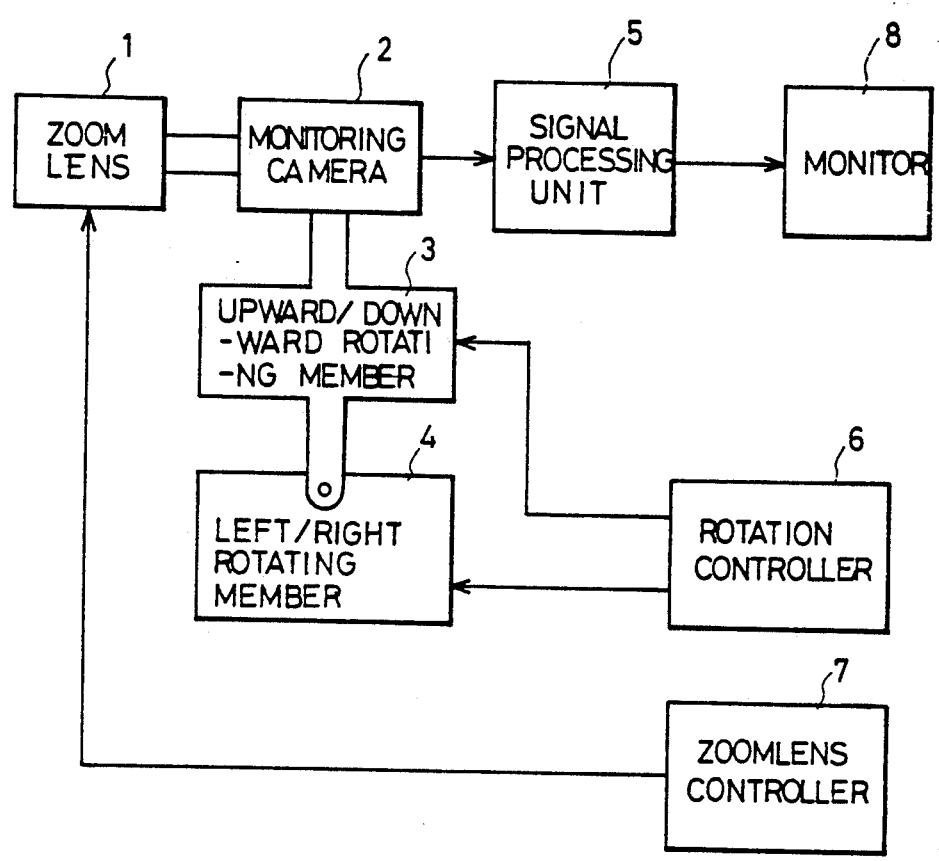
FIG. 1 is a block diagram of conventional monitoring apparatus for a monitoring camera of a CCTV.
Figure 2:
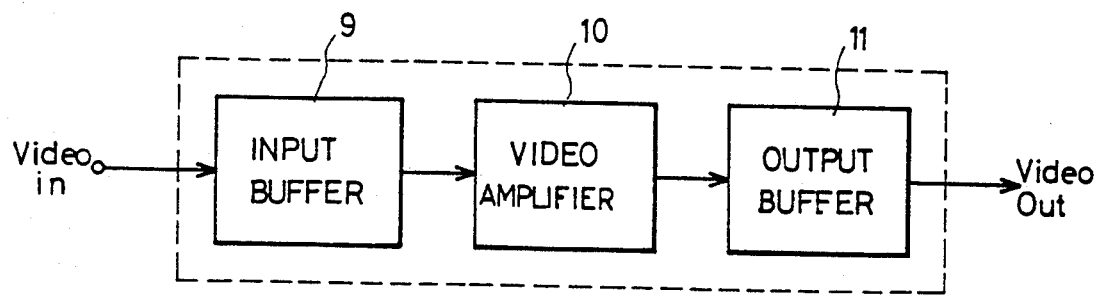
FIG. 2 is a detailed diagram of a signal processing unit in FIG. 1.
Figure 7:
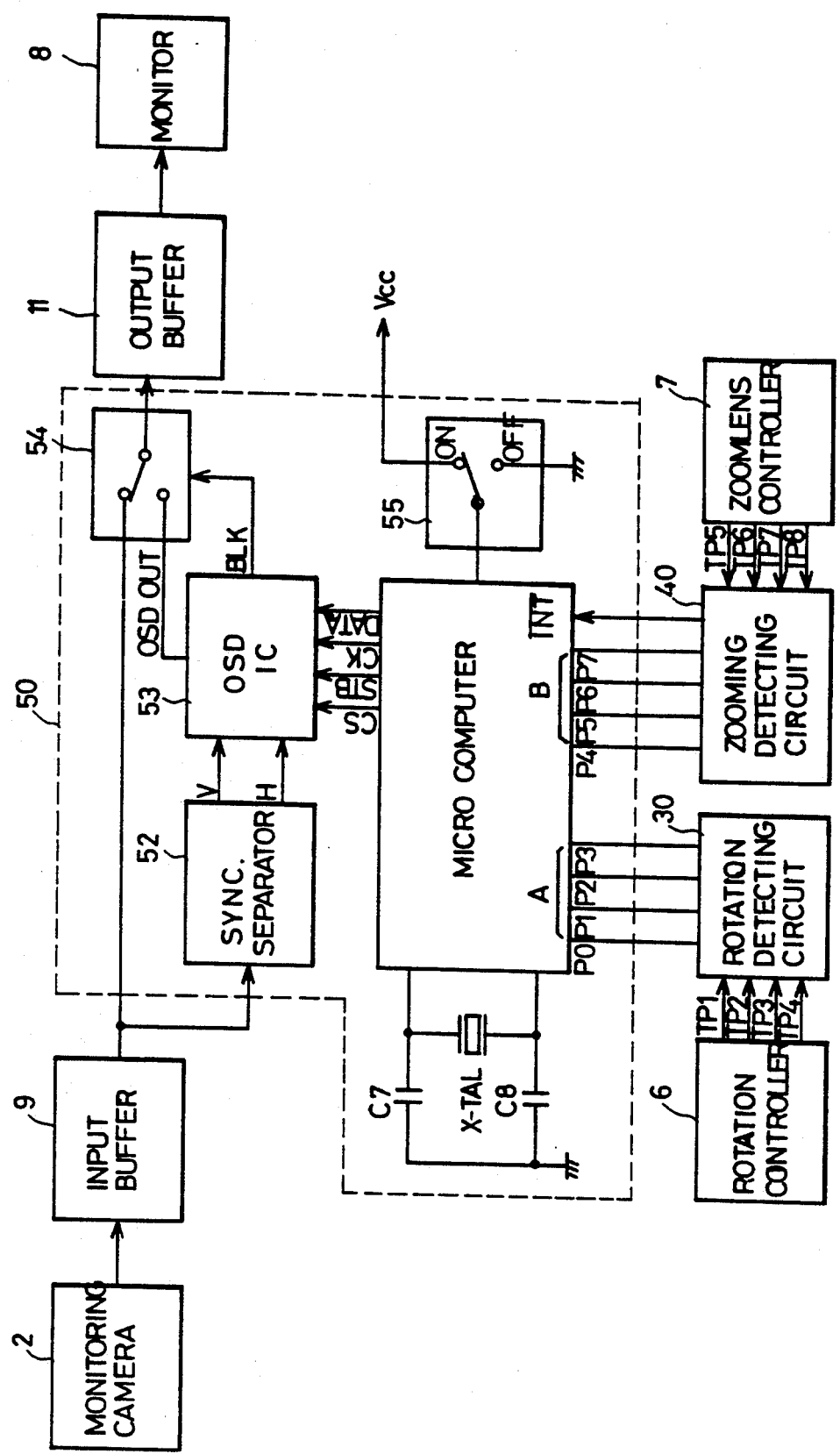
FIG. 7 is a block diagram of monitoring apparatus for a monitoring camera of a CCTV in accordance with the present invention.

With reference to FIG. 7, there is shown a block diagram of the monitoring apparatus for the monitoring camera of the CCTV in accordance with the present invention. As shown in this drawing, the monitoring apparatus comprises a rotation state detecting circuit 30 for detecting states that the monitoring camera 2 (FIG. 1) is adjusted upwardly, downwardly, left and right, from the upward, downward, left and right rotation controller 6, a zooming state detecting circuit 40 for detecting zooming states of the monitoring camera 2 from the zoom lens controller 7, and an on-screen display control circuit 50 for generating an on-screen display signal to display the upward, downward, left and right adjusted states and the zooming states of the monitoring camera 2 on the screen of the monitor 8 (FIG. 1) in response to upward, downward, left and right adjusted state detect signals from the rotation state detecting circuit 30 and zooming state detect signals from the zooming state detecting circuit 40 and then combining the on-screen display signal with a video signal from the monitoring camera 2 to output them to the monitor 8.

The on-screen display control circuit 50 includes an on-screen display switch 55 for selecting display of the adjusted states and zooming states of the monitoring camera 2 on the screen under a control of the user, and a microcomputer 51 for generating on-screen display (OSD) data and a plurality of control signals to display the upward, downward, left and right adjusted states and the zooming states of the monitoring camera 2 on the screen in response to the upward, downward, left and right adjusted state detect signals from the rotation state detecting circuit 30 and the zooming state detect signals from the zooming state detecting circuit 40, in accordance with the selection of the on-screen display by the on-screen display switch 55.

The on-screen display control circuit 50 is also provided with a synchronous signal separator 52 for separating a horizontal synchronous signal and a vertical synchronous signal from the video signal through the input buffer 9 in the signal processing unit 5 (FIG. 1) from the monitoring camera 2, an on-screen display integrated circuit (IC) 53 for generating the on-screen display signal based on the on-screen display data from the microcomputer 51 in response to the control signals from the microcomputer 51 and synchronously with the vertical and horizontal synchronous signals from the synchronous signal separator 52, and a video signal switch 54 for selectively outputting one of the on-screen display signal from the on-screen display IC 53 and the video signal from the input buffer 9 to the monitor 8 through the output buffer 11.

Figure 8:
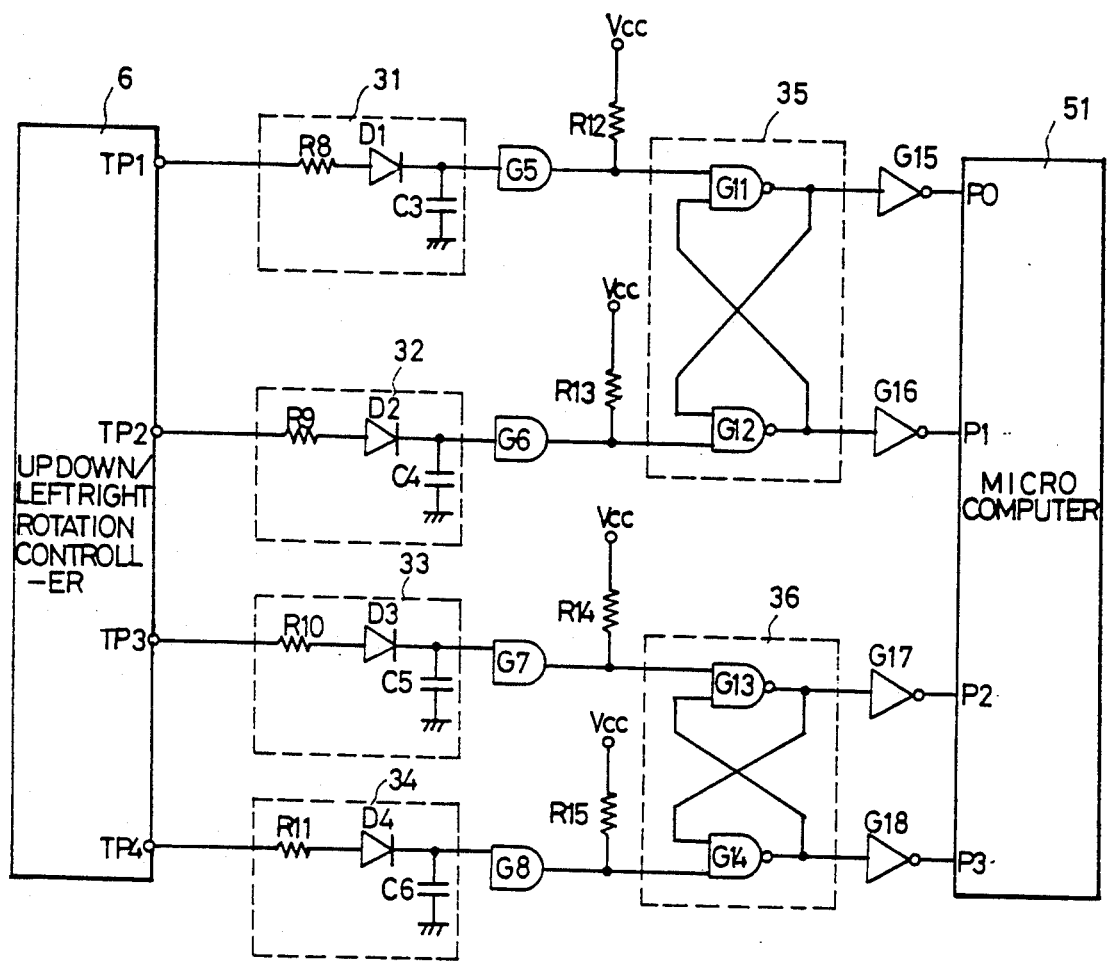
FIG. 8 is a detailed circuit diagram of a rotation state detecting circuit in FIG. 7.

With reference to FIG. 8, there is shown a detailed circuit diagram of the rotation state detecting circuit 30 in FIG. 7. As shown in this drawing, the rotation state detecting circuit 30 includes a plurality of rectifying circuits 31-34 for half-wave rectifying and smoothing output signals TP1, TP2, TP3 and TP4 from the upward, downward, left and right rotating switches SW1, SW2, SW3 and SW4 in the upward, downward, left and right rotation controller 6, respectively, a plurality of AND gates G5–G8 for Schmidt-triggering output signals from the rectifying circuits 31–34, respectively, a first latch 35 having two NAND gates G11 and G12, for latching output signals from the AND gates G5 and G6 and outputting upward/downward adjust signals P0 and P1 to the microcomputer 51 through inverter gates G15 and G16, and a second latch 36 having two NAND gates G13 and G14, for latching output signals from the AND gates G7 and G8 and outputting left/right adjust signals P2 and P3 to the microcomputer 51 through inverter gates G17 and G18.

Figure 9:
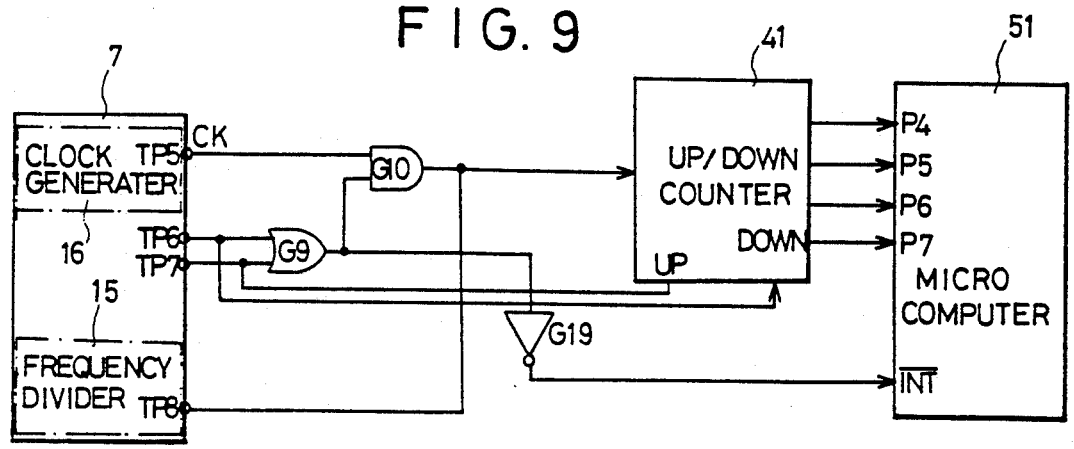
FIG. 9 is a detailed circuit diagram of a zooming state detecting circuit in FIG. 7.

With reference to FIG. 9, there is shown a detailed circuit diagram of the zooming state detecting circuit 40 in FIG. 7. As shown in this drawing, the zooming state detecting circuit 40 includes an OR gate G9 for ORing output signals TP6 and TP7 from the zoom buttons PB1 and PB2 in the zoom lens controller 7, an inverter gate G19 for inverting an output signal from the OR gate G9 and outputting the inverted signal as a zooming interrupt signal/INT to the microcomputer 51, an AND gate G10 for ANDing the output signal from the OR gate G9 and a clock signal TP5 from the clock generator 16 in the zoom lens controller 7, and an up/down counter 41 for receiving the output signals TP6 and TP7 from the zoom buttons PB1 and PB2, as UP/-DOWN signals and an output signal from the AND gate G10 and a frequency-divided signal TP8 from the frequency divider 15 in the zoom lens controller 7, commonly, as a count clock signal, and performing a zooming up/down counting operation in accordance with the received signals to output count signals P4–P7 to the microcomputer 51.

Now, the operation of the monitoring apparatus for the monitoring camera of the CCTV with the above-mentioned construction in accordance with the present invention will be described in detail.

Figure 3:
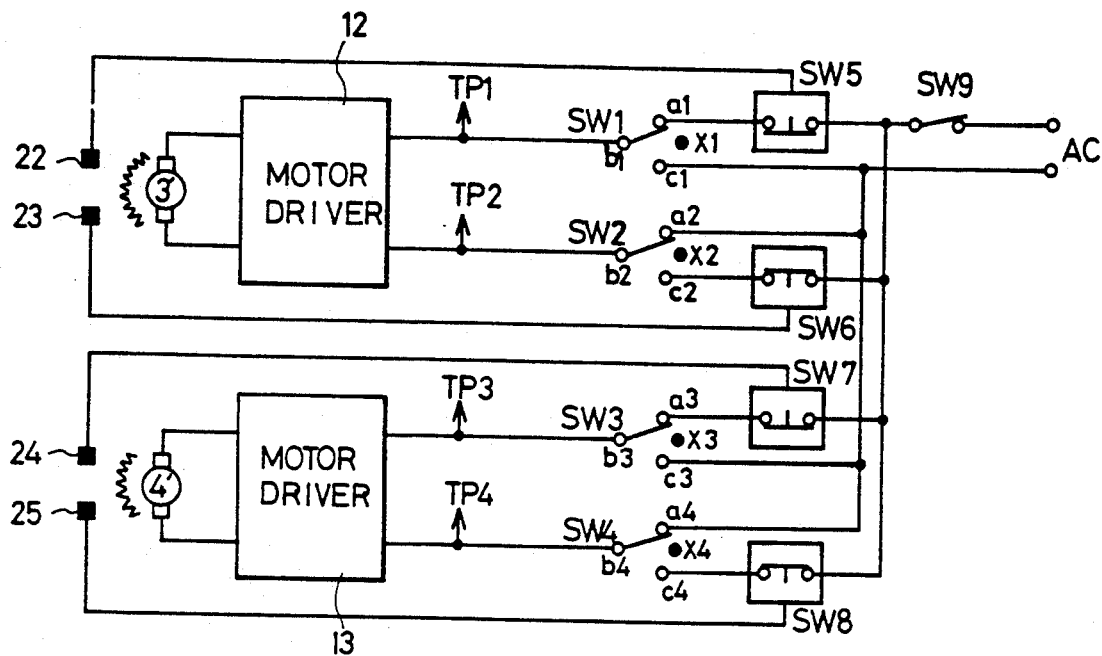
FIG. 3 is a detailed diagram of an upward, downward, left and right rotation controller in FIG. 1.
Figure 4:
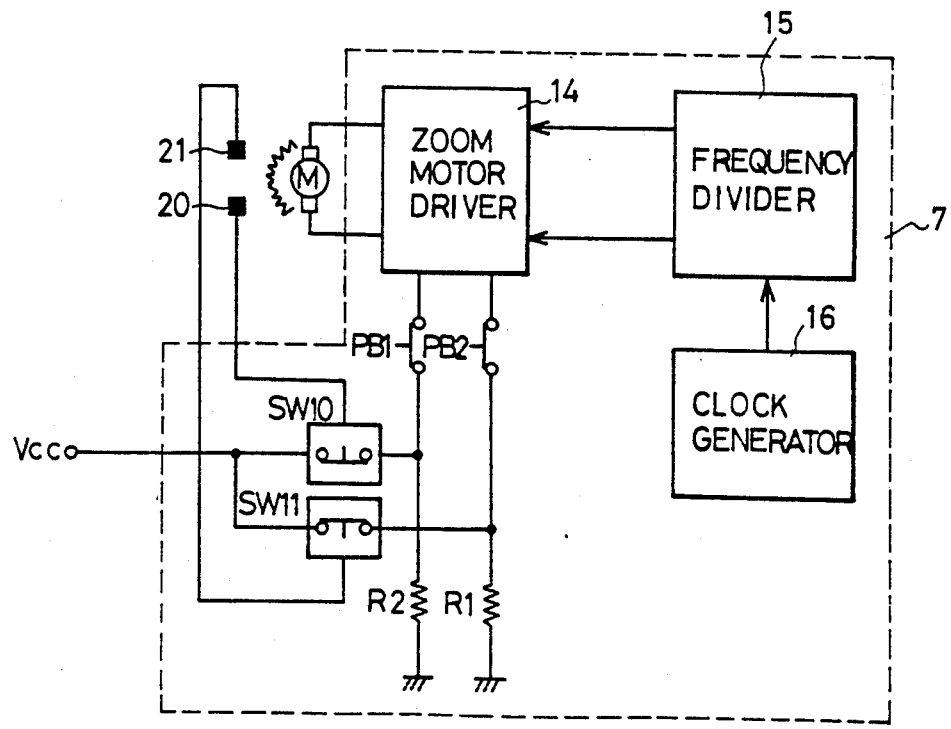
FIG. 4 is a detailed diagram of a zoom lens controller in FIG. 1.
Figure 5A:
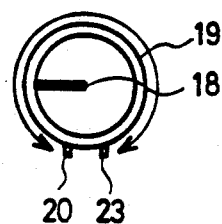
FIGS. 5A and 5B illustrate the positioning of rotation limited position detecting contacts in FIG. 3.
Figure 5B:
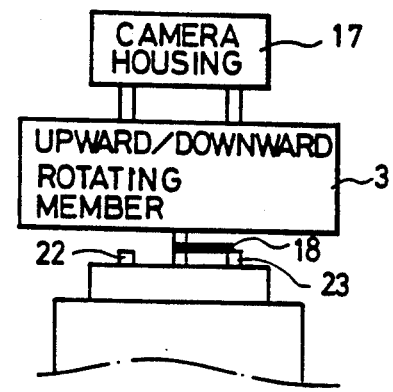
Figure 6:
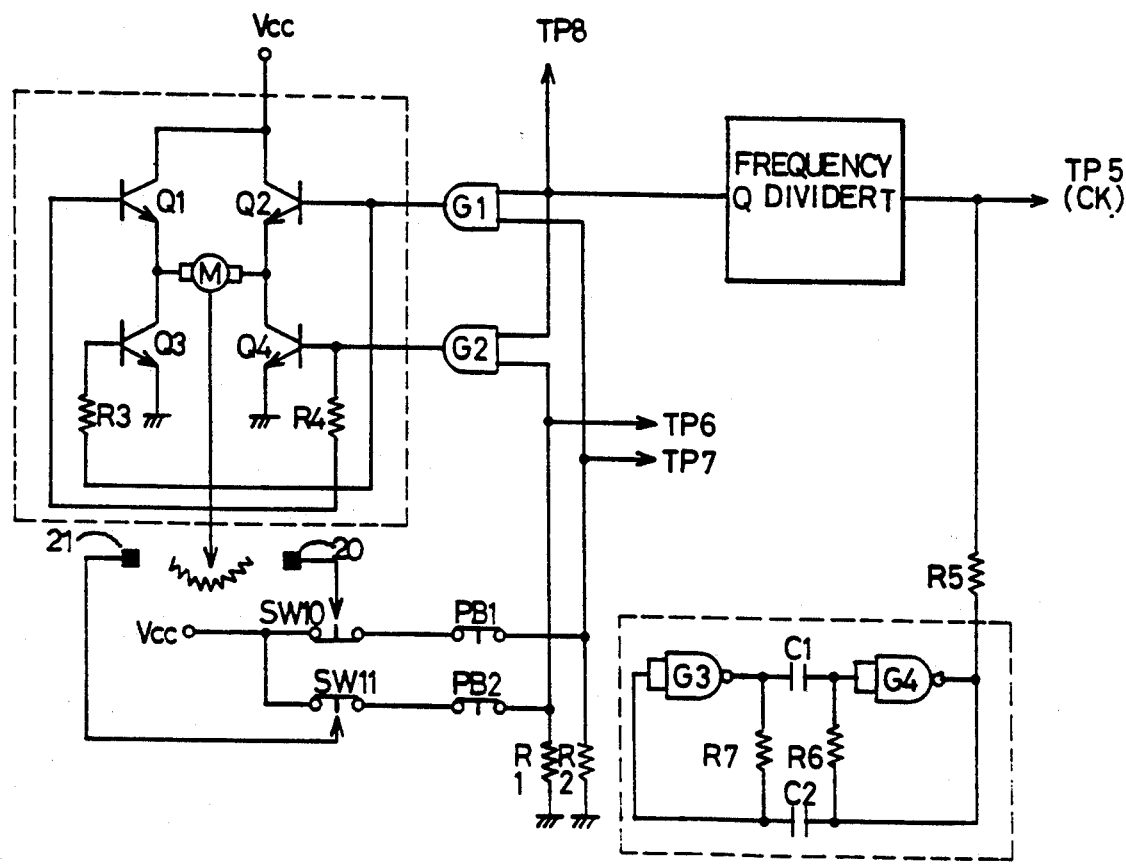
FIG. 6 is a detailed circuit diagram of the zoom lens controller in FIG. 4.

First, when the user wishes to adjust the image pickup angle of the monitoring camera 2 upwardly and downwardly and to the left and right, he or she turns on the power control switch SW9 and FIG. 3 and then operates the upward/downward rotating switches SW1 and SW2 and the left/right rotating switches SW3 and SW4 in the upward, downward, left and right rotation controller 6 in FIG. 3. At this time, the flow direction of the AC power is detected which is supplied to the upward/downward and left/right rotating motor drivers 12 and 13. That is, the output signals TP1, TP2, TP3 and TP4 at the movable terminals b1-b4 of the upward, downward, left and right rotating switches SW1, SW2, SW3 and SW4 are applied respectively to the rectifying circuits 31–34 in the rotation state detecting circuit 30 through resistors R8–R11. In the rectifying circuits 31–34, the signals TP1, TP2, TP3 and TP4 are half-wave rectified respectively by diodes D1–D4 and then the half-wave rectified signals are smoothed respectively by condensers C3–C6. The half-wave rectified and smoothed signals from the rectifying circuits 31–34 are shaped into binary signals respectively by the AND gates G5–G8.

For example, if the user operates the upward/downward rotating switches SW1 and SW2 such that their movable terminals b1 and b2 are connected respectively to their one fixed terminals a1 and a2, as shown in FIG. 3, a plus voltage of the AC power is first applied through the upward rotating switch SW1. The plus voltage TP1 at the movable terminal b1 of the upward rotating switch SW1 is half-wave rectified and smoothed by the rectifying circuit 31. The half-wave rectified and smoothed signal from the rectifying circuit 31 are wave-shaped into a high signal by the AND gate G5. This AND gate G5 is naturally applied to one input terminal of the NAND gate G11 in the latch 35. Since the output signal from the rectifying circuit 32 is applied as a low signal to one input terminal of the NAND gate G12, the NAND gate G12 outputs a high signal, regardless of the other input. This high signal from the NAND gate G12 is applied to the other input terminal of the NAND gate G11. For this reason, the NAND gate G11 outputs a low signal. This low signal from the NAND gate G11 is inverted into a high signal by the inverter gate G15 and the high-inverted signal from the inverter gate G15 is then applied to input port P0 of the microcomputer 51. The low signal from the NAND gate G11 is also fed back to the other input terminal of the NAND gate G12. As a result, the NAND gate G12 continues to output the high signal although its one input terminal is applied with a high signal, unless the output signal from the NAND gate G11 is inverted. This high signal from the NAND gate G12 is fed back to the other input terminal of the NAND gate G11 and is also inverted into a low signal by the inverter gate G16. Then, the low-inverted signal from the inverter gate G16 is then applied to input port P1 of the microcomputer 51.

On the other hand, if the user operates the upward/downward rotating switches SW1 and SW2 such that their movable terminals b1 and b2 are connected respectively to their other fixed terminals c1 and c2, differently from that shown in FIG. 3, the plus voltage of the AC power is first applied through the downward rotating switch SW2. The plus voltage TP2 at the movable terminal b2 of the downward rotating switch SW2 is half-wave rectified and smoothed by the rectifying circuit 32. The half-wave rectified and smoothed signal from the rectifying circuit 32 are wave-shaped into a high signal by the AND gate G6. The high signal from the AND gate G6 is naturally applied to one input terminal of the NAND gate G12 in the latch 35. Since the output signal from the rectifying circuit 31 is applied as a low signal to one input terminal of the NAND gate G11 in the latch 35 through the AND gate G5, the NAND gate G11 outputs a high signal, regardless of the other input. This high signal from the NAND gate G11 is applied to the other input terminal of the NAND gate G12. For this reason, the NAND gate G12 outputs a low signal. This low signal from the NAND gate G12 is inverted into a high signal by the inverter gate G16 and the high-inverted signal from the inverter gate G16 is then applied to the input port P1 of the microcomputer 51. The low signal from the NAND gate G12 is also fed back to the other input terminal of the NAND gate G11. As a result, the NAND gate G11 continues to output the high signal although its one input terminal is applied with a high signal, unless the output signal from the NAND gate G12 is inverted. This high signal from the NAND gate G11 is fed back to the other input terminal of the NAND gate G12 and is also inverted into a low signal by the inverter gate G15. Then, the low-inverted signal from the inverter gate G15 is then applied to the input port P0 of the microcomputer 51.

Similarly, the left and right adjusted states of the monitoring camera 2 are detected by the rotation state detecting circuit 30, with the output signals TP3 and TP4 from the left/right rotating switches SW3 and SW4, in a similar manner to those in the detects of the upward and downward adjusted states of the monitoring camera 2. In the rotation state detecting circuit 30, the rectifying circuits 33 and 34 and the latch 36 operate to output the left/right rotation detect signals to input ports P2 and P3 of the microcomputer 51.

On the other hand, the output signals TP6 and TP7 from the zoom buttons PB1 and PB2 in the zoom lens controller 7 are inputted to the zooming state detecting circuit 40. In the zooming state detecting circuit 40, the signals TP6 and TP7 are ORed by the OR gate G9, the output of which is inverted by the inverter gate G19. The signal inverted by the inverter G19 is applied to interrupt input port of the microcomputer 51, as the interrupt signal/INT which is indicative of the operation in zooming. If the user turns on the zoom button PB1 for zooming, the output signal TP6 of high level from the zoom button PB1 is applied to one input terminal of the OR gate G9 and DOWN count enable terminal of the up/down counter 41. For this reason, the up/down counter 41 operates in the down count mode and a high signal from the OR gate G9 is inverted into a low signal by the inverter gate G19. The low-inverted signal from the inverter gate G19 is applied to the interrupt input port of the microcomputer 51, as the zooming interrupt signal/INT of active state. Also, since the output signal from the OR gate is high, the output signal TP5, or clock signal CK from the clock generator 16 in the zoom lens controller 7 is applied as the count clock signal to the up/down counter 41 through the AND gate G10. As a result, the up/down counter 41 initiates the down counting operation from the point of time that the zoom button PB1 is pushed and continues to perform the down counting operation until the zoom button PB1 is opened or the zooming limiting switch SW10 is turned off by the zooming limited position detect. The counted value from the up/down counter 41 is inputted to the microcomputer 51.

Similarly, in the case where the user pushes the zoom button PB2, the up/down counter 41 performs the up counting operation in a similar manner to that in the case where the zoom button PB1 is pushed and the counted value therefrom is inputted to the microcomputer 51.

Figure 10:
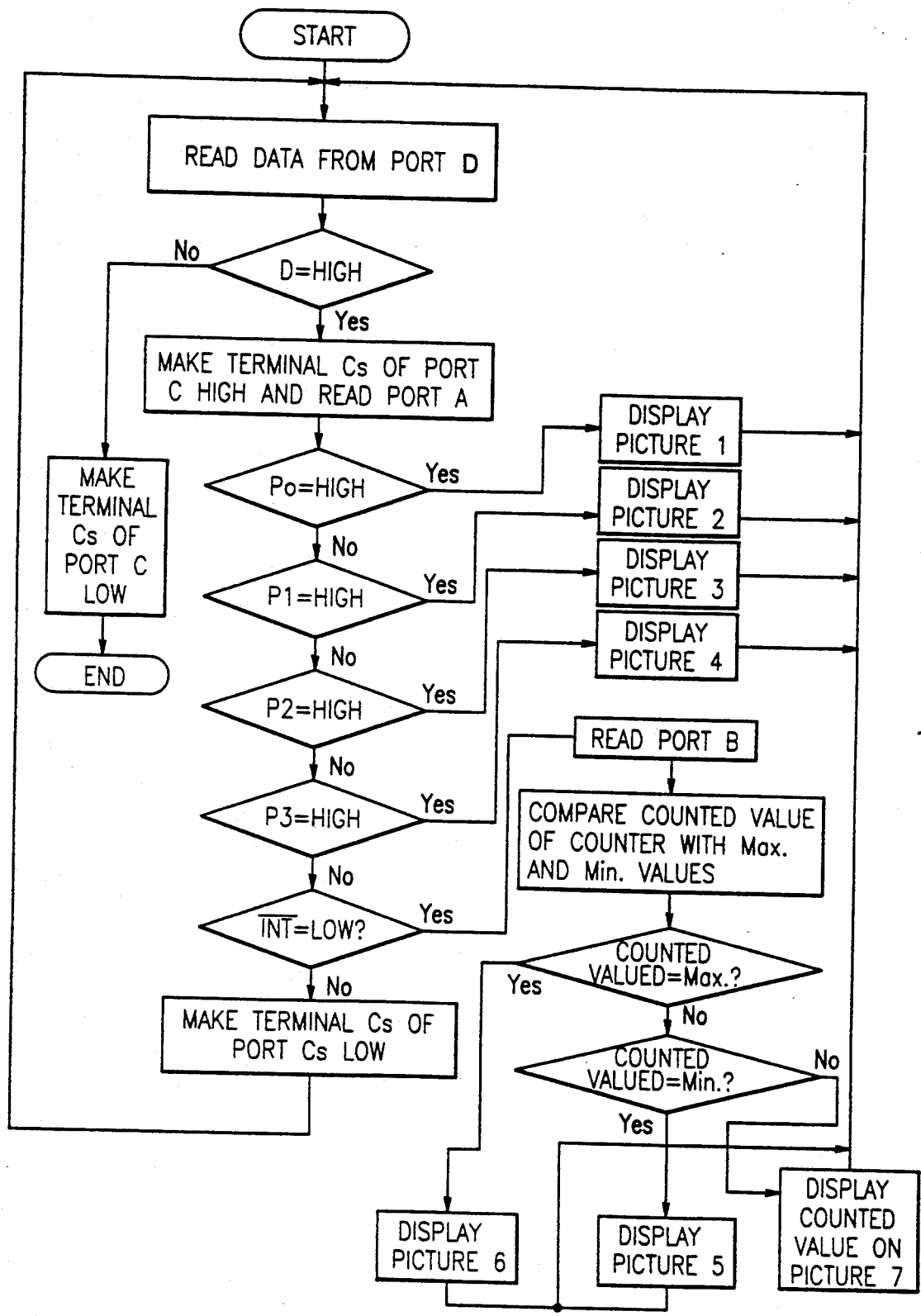
FIG. 10 is a flowchart illustrating an on-screen display control operation of a microcomputer in FIG. 7, according to the present invention.
Figure 11:
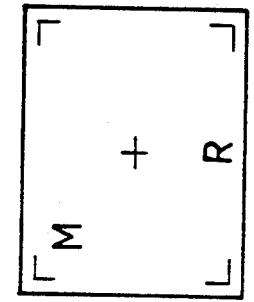
FIGS. 11A to 11G illustrates on-screen display pictures corresponding to the monitored states of the monitoring camera.
Figure 11:
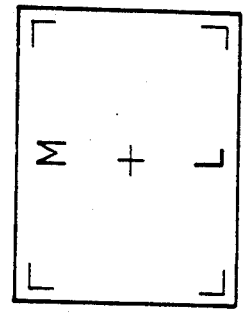
Figure 11:
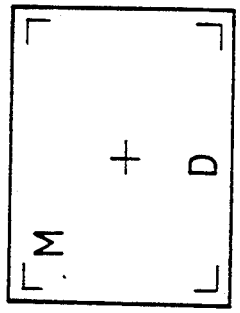
Figure 11:
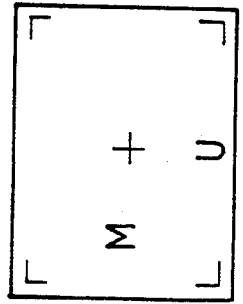
Figure 11:
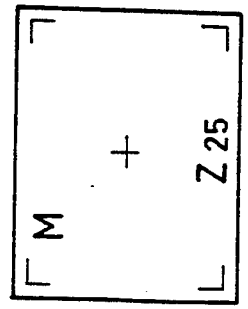
Figure 11:
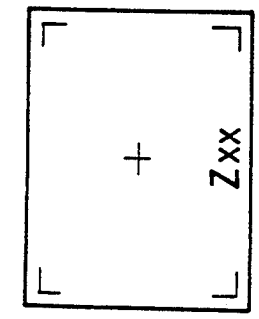
Figure 11:
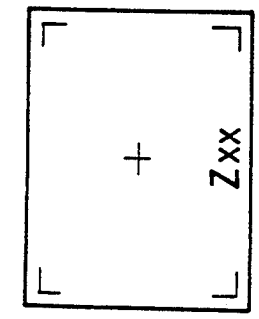

In result, to the microcomputer 51 is applied to detect signals with respect to the upward, downward, left and right rotation controlled states of the monitoring camera 2, from the rotation state detecting circuit 30 and the counted values with respect to the zoom-in/out states of the zoom lens 1 and the zooming interrupt signal, from the zooming state detecting circuit 40. At this time, if the user turns on the on-screen display switch 55, the microcomputer 51 performs the operation as shown in FIG. 10 to display the camera monitored states on the screen of the monitor 8 as shown in FIG. 11. If the microcomputer 51 makes the on-screen display IC 53 enable and outputs the on-screen display data, the on-screen display IC 53 outputs the on-screen display signal based on the on-screen display data from the microcomputer 51 in response to the control signal from the microcomputer 51 and synchronously with the vertical and horizontal synchronous signals from the synchronous signal separator 52. The on-screen display signal from the on-screen display IC 53 is applied to the monitor 8 through the output buffer 11 by the video signal switch 54, with the signal being placed on the video signal from the monitoring camera 2 during a vertical blanking interval of the video signal. With this on-screen display signal, the monitored results of the monitoring camera 2 are displayed on the screen of the monitor 8.

Now, the on-screen display control process of the microcomputer 51 will be described, in conjunction with FIG. 10 which shows a flowchart of the on-screen display control process. As shown in FIG. 10, the microcomputer 51 first scans the input port D which receives an output signal from the on-screen display switch 55 and determines whether the on-screen display switch 55 is at its ON state (D=HIGH). If the on-screen display switch 55 is at its OFF state (D=LOW), that microcomputer 51 sends a low signal to the on-screen display IC 53 through the chip select terminal CS of the port C, so as to make the on-screen display IC 53 disable. Thereafter, the microcomputer 55 checks whether the on-screen display switch 55 is at its ON state.

If the user turns on the on-screen display switch 55 of FIG. 7, then the microcomputer 51 operates to perform the on-screen display control based on the results of monitoring the monitoring camera 2 according to the control process.

That is, the microcomputer 51 checks whether the on-screen display switch 55 is at its ON state. When the on-screen display switch 55 is at its ON state, the microcomputer 51 first performs an on-screen display mode select step (STEP 1) for making the on-screen display IC 53 enable. Upon the selection of the on-screen display mode, the microcomputer 51 performs a rotation state on-screen display step (STEP 2) which comprises the steps of checking the upward, downward, left and right adjusted states of the monitoring camera 2 detected by the rotation state detecting circuit 30 and displaying the checked results on the screen by the on-screen display IC 53. If the zooming interrupt signal/INT from the zooming state detecting circuit 30 becomes active on the basis of the adjustment of the zoom lens 1 other than the upward, downward, left and right adjustment of the monitoring camera 2, in the on-screen display mode, the microcomputer 51 performs a zooming state on-screen display step (STEP 3) which comprises the steps of checking the zooming states of the monitoring camera 2 and displaying the checked results on the screen by the on-screen display IC 53. Thus, the microcomputer 51 accomplishes the on-screen display control for the results of monitoring the monitoring camera 2, by performing the above-mentioned steps.

Therefore, if the user turns on the on-screen display switch 55, the microcomputer 51 then senses the ON state of the on-screen display switch 55 and sends a high signal to the on-screen display IC 53 through the chip select terminal CS of the port C, thereby causing the on-screen display IC 53 enable. Subsequently, the microcomputer 51 reads an output signal from the rotation state detecting circuit 30, through the port A. The microcomputer 51 checks sequentially input ports P0 to P3 receiving detect signals from the rotation state detecting circuit 30. In case of receiving a high signal at least one of ports P0 to P3 (P0, P1, P2 or P3=HIGH), the microcomputer 51 sends on-screen display data corresponding to the corresponding one of pictures 1 to 4 as shown in FIGS. 11A to 11D.

In FIG. 11A, the picture 11 shows an on-screen display picture corresponding to the case that the image pickup angle of the monitoring camera 2 is adjusted upwardly (P0=HIGH). In this case, a camera state display mark M for displaying the current image pickup angle and the zooming states of the monitoring camera 2 are displayed on the left middle portion of the picture. At the center of the picture, a zooming point mark + is displayed. Also, an up display mark U indicative of the upward adjustment mode is displayed on the center portion of the lower end of picture. On the other hand, the picture 2 shows an on-screen display picture corresponding to the case that the image pickup angle of the monitoring camera 2 is adjusted downwardly (P1=HIGH). The picture 3 shows an on-screen display picture corresponding to the case that the image pickup angle of the monitoring camera 2 is adjusted left (P2=HIGH), while the picture 4 shows an on-screen display picture corresponding to the case that the image pickup angle of the monitoring camera 2 is adjusted right (P3=HIGH).

However, in case of receiving a high signal at none of ports P0 to P3 adapted to receive detect signals from the rotation state detecting circuit 30, that is, when the monitoring camera 2 is not adjusted, the microcomputer 51 checks its zooming interrupt input ports. If detecting the zooming control state, that is, in case that the interrupt signal /INT is a low, active signal, the microcomputer 51 reads signals, in a 4-bit data type, loaded through input ports P4 to P7 receiving output signals from the zooming state detecting circuit 40. The microcomputer 51 then compares the data with a maximum value MAX predetermined as a zooming limit value. If the data corresponds to the maximum value MAX, the microcomputer 51 performs on-screen display under the condition of enlarging the camera state display mark M to a maximum magnitude, as shown in the picture 6 of FIG. 11. When the date does not correspond to the maximum value MAX, the microcomputer 51 compares the data with a minimum value MIN predetermined as a zooming limit value. If the data corresponds to the minimum value MIN, the microcomputer 51 performs on-screen display under the condition of erasing the camera state display mark M, as shown in the picture 7 of FIG. 11. On the other hand, if the data is less than the maximum value MAX, but more than the minimum value MIN, the microcomputer 51 performs on-screen display under the condition of enlarging the camera state display mark M to a magnitude corresponding to the data outputted from the zooming state detecting circuit 40, as shown in the picture 5 of FIG. 11. In each zooming state display case, the zooming mode and the zooming magnitude are also displayed on the lower end portion of the corresponding picture (for example, "Z 25").

As apparent from the above description, the present invention provides monitoring apparatus and method for a monitoring camera of a CCTV wherein the image pickup angle change states caused by the upward, downward, left or right rotations of the monitoring camera and the zooming states are displayed on the screen, in the form of operation state display marks which are indicative of corresponding operation modes. Accordingly, the user can recognize easily the current operation mode and the current zooming state of the monitoring camera, so that subsequent control can be easily and accurately carried out. In each zooming state case, the current operation state display mark is displayed under the condition of being enlarged to the corresponding zooming magnitude, together with the zooming magnitude. As a result, the user can monitor easily portions of picture to be carefully monitored, in that the portions are enlarged.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for monitoring a CCTV monitoring camera, comprising:
   rotation state detecting means for detecting states in which said monitoring camera is adjusted upwardly, downwardly, left and right, in response to an upward, downward, left and right rotation controller;
   zooming state detecting means for detecting zooming states of said monitoring camera in response to a zoom controller; and
   on-screen display control means for generating an on-screen display signal to display the upward, downward, left and right adjusted states and the zooming states of said monitoring camera on the screen of a monitor in response to upward, downward, left and right adjusted state detect signals from said rotation state detecting means and zooming state detect signals from said zooming state detecting means, and then combining the on-screen display signal with a video signal from said monitoring camera to output them to said monitor; wherein said rotation state detecting means includes:
   a plurality of rectifying means for half-wave rectifying and smoothing output signals from upward, downward, left and right rotating switches in said upward, downward, left and right rotation controller, respectively;
   a plurality of wave-shaping means for wave-shaping output signals from said rectifying means, respectively; and
   first and second latching means for latching output signals from said wave-shaping means and outputting upward/downward adjust signals and left/right adjust signals to said on-screen display control means through a plurality of inverter gates, respectively.

2. The apparatus as claimed in claim 1, wherein said on-screen display control means includes:
   an on-screen display switch which is operable for selecting display of the adjusted states and zooming states of said monitoring camera on the screen under a control of a user;
   a microcomputer for generating on-screen display data and a plurality of control signals to display the upward, downward, left and right adjusted states and the zooming states of said monitoring camera on the screen in response to the upward, downward, left and right adjusted state detect signals from said rotation state detecting means and the zooming state detect signals from said zooming state detecting means, in accordance with the selection of the on-screen display by said on-screen display switch:
   synchronous signal separating means for separating a horizontal synchronous signal and a vertical synchronous signal from the video signal through an input buffer from said monitoring camera;
   on-screen display signal generating means for generating the on-screen display signal based on the on-screen display data from said microcomputer synchronously with the vertical and horizontal synchronous signals from said synchronous signal separating means under a control of said microcomputer; and video signal switching means for selectively outputting one of the on-screen display signal from said on-screen display signal generating means and the video signal from said input buffer to said monitor through an output buffer.

3. An apparatus for monitoring a CCTV monitoring camera, comprising:

rotation state detecting means for detecting states in which said monitoring camera is adjusted upwardly, downwardly, left and right, in response to an upward, downward, left and right rotation controller;

zooming state detecting means for detecting zooming states of said monitoring camera in response to a zoom controller; and on-screen display control means for generating an on-screen display signal to display the upward, downward, left and right adjusted states and the zooming states of said monitoring camera on the screen of a monitor in response to upward, downward, left and right adjusted state detect signals from said rotation state detecting means and zooming state detect signals from said zooming state detecting means, and then combining the on-screen display signal with a video signal from said monitoring camera to output them to said monitor, wherein said zooming state detecting means includes:

an OR gate for ORing output signals from zoom buttons in said zoom lens controller;

an inverter gate for inverting an output signal from said OR gate and outputting the inverted signal as a zooming interrupt signal to said on-screen display control means;

an AND gate for ANDing the output signal from said OR gate and a clock signal from a clock generator in said zoom lens controller; and an up/down counter for receiving the output signals from said zoom buttons, as UP/DOWN signals and an output signal from said AND gate and a frequency-divided signal from a frequency divider in said zoom lens controller, commonly, as a count clock signal, and performing a zooming up/down counting operation in accordance with the received signals to output count signals to said on-screen display control means.

4. A method for monitoring a CCTV monitoring camera, comprising the steps of:

checking whether an on-screen display switch is at its ON state and enabling an on-screen display when the on-screen display switch is at its ON state;

checking upward, downward, left and right adjusted states of the monitoring camera detected by a rotating state detecting circuit, upon the selection of the on-screen display mode, and displaying the checked results on the screen; and checking zooming states of the monitoring camera, if a zooming interrupt signal from a zooming state detecting circuit becomes active on the basis of the adjustment of a zoom lens in the on-screen display mode, and displaying the checked results on the screen, wherein said zooming state on-screen display step comprises the steps of:

comparing sequentially a zooming adjustment count data value detected from an up/down counter of the zooming state detecting circuit, with a predetermined maximum zooming limit value and a predetermined minimum zooming limit value;

if current zooming adjustment data is equal to or more than the maximum zooming limit value, enlarging a camera state display mark displayed on a predetermined portion of the screen to a maximum magnitude;

if the current zooming adjustment data is less than the minimum zooming limit value, erasing the camera state display mark; and if the current zooming adjustment data is between the maximum zooming limit value and the minimum zooming limit value, enlarging/reducing the camera state display mark to a corresponding magnitude and displaying the magnitude on the screen.

5. The method as claimed in claim 4, wherein said rotation state on-screen display step comprises the steps of:

checking sequentially upward, downward, left and right rotation adjusted states of the monitoring camera detected by the rotation state detecting circuit; and displaying each of the checked states on the screen such that a camera state display mark is displayed on a desired portion of the screen, a center point mark on the center portion of the screen, an adjustment mode display mark on the middle portion of the lower end of the screen.

6. A method for monitoring a CCTV monitoring camera according to claim 4, wherein the magnitude is displayed on the center portion of the lower end of the screen, when the current zooming adjustment data is between the maximum and minimum zooming limit values.

7. A method for monitoring a CCTV monitoring camera according to claim 6, wherein the on-screen display is enabled by enabling an on-screen display IC, which is operable for displaying the above-mentioned checked results.

8. A method for monitoring a CCTV monitoring camera according to claim 4, wherein the on-screen display is enabled by enabling an on-screen display IC, which is operable for displaying the above-mentioned checked results.

* * * * *